June 9, 1964 H. J. ALBRECHT 3,136,080
CONTROL MEANS FOR STEAM IRONS
Filed Jan. 8, 1963
3 Sheets-Sheet 1
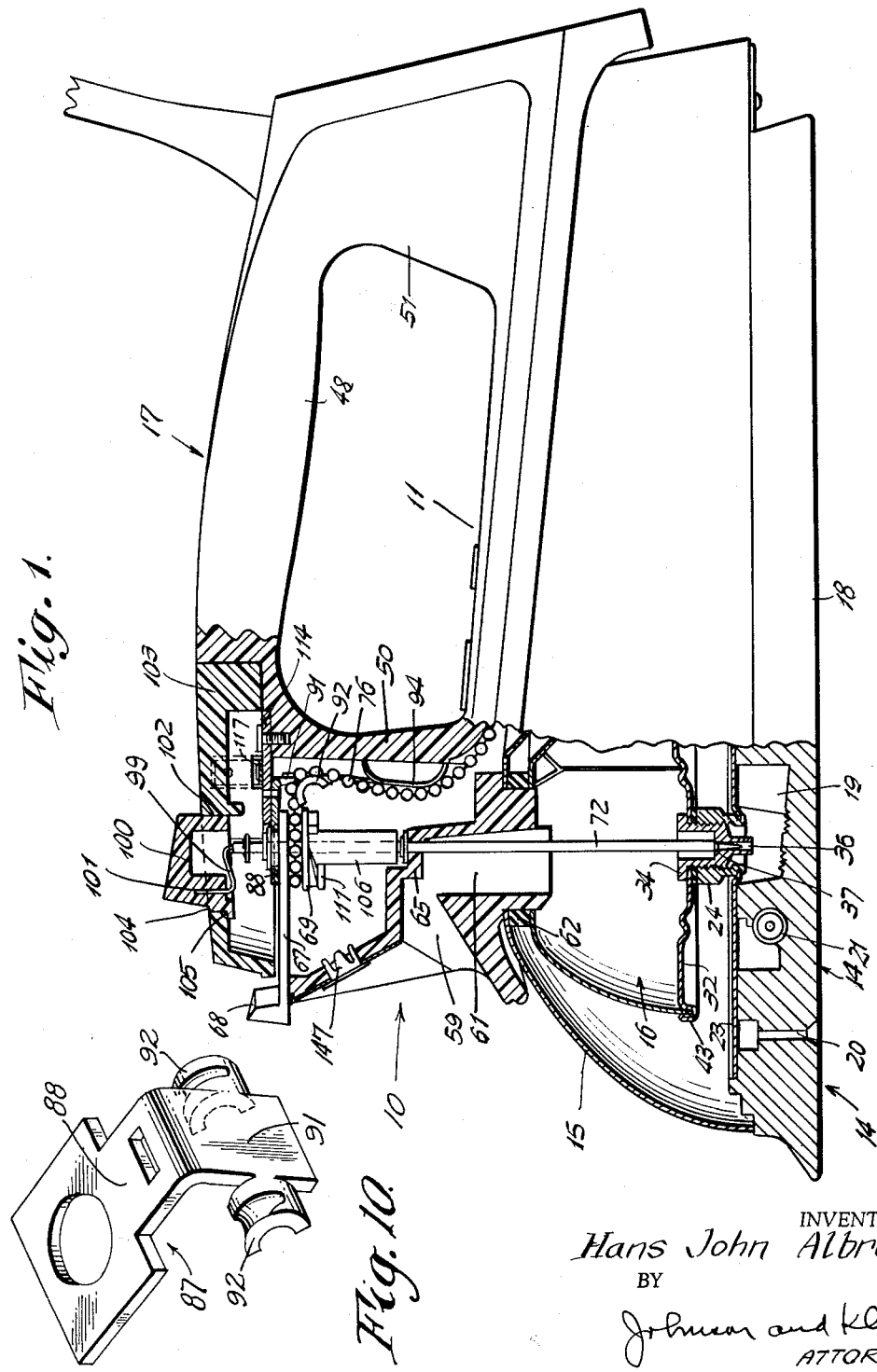
INVENTOR.
Hans John Albrecht
BY
Johnson and Kline
ATTORNEYS

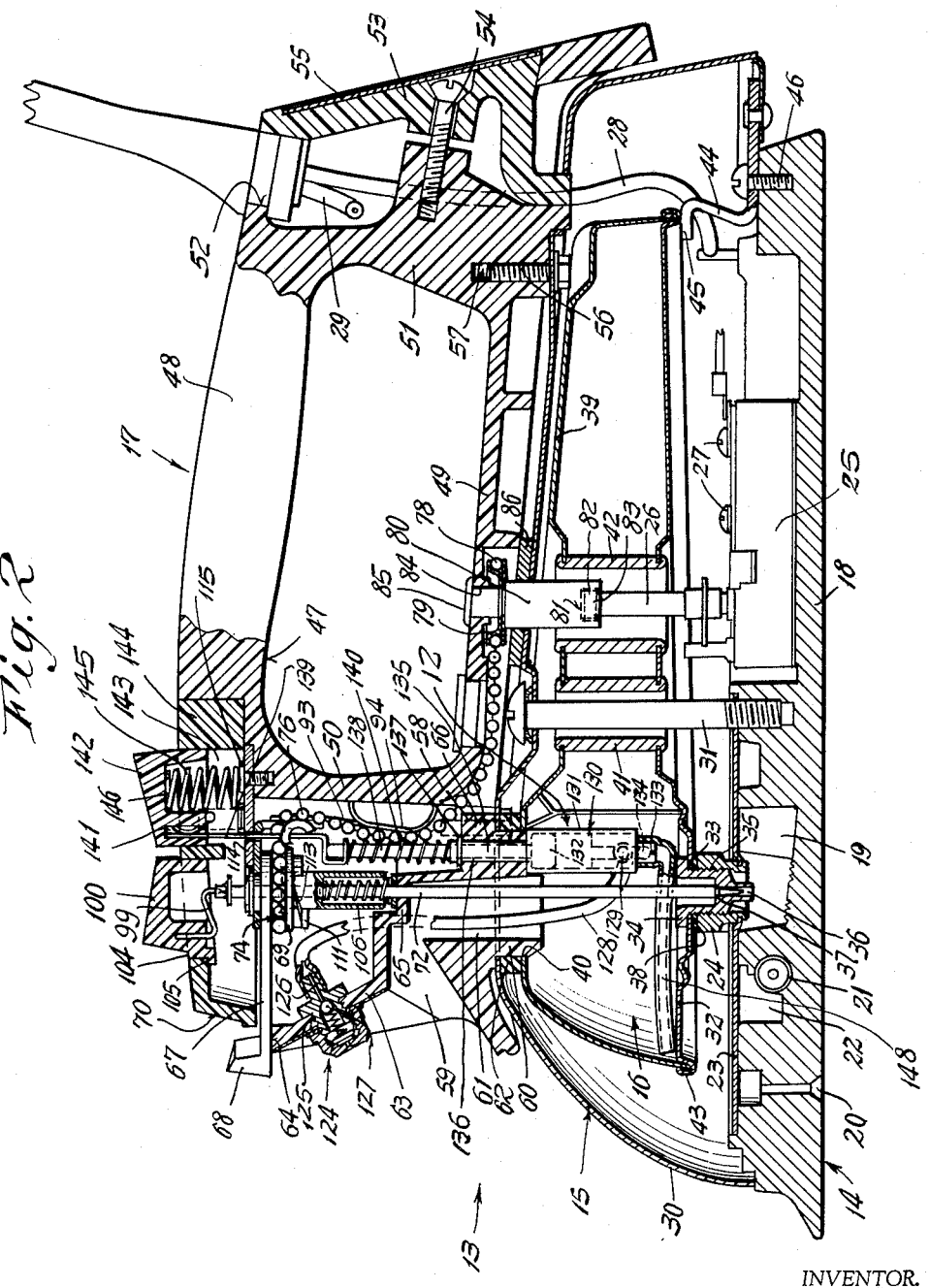

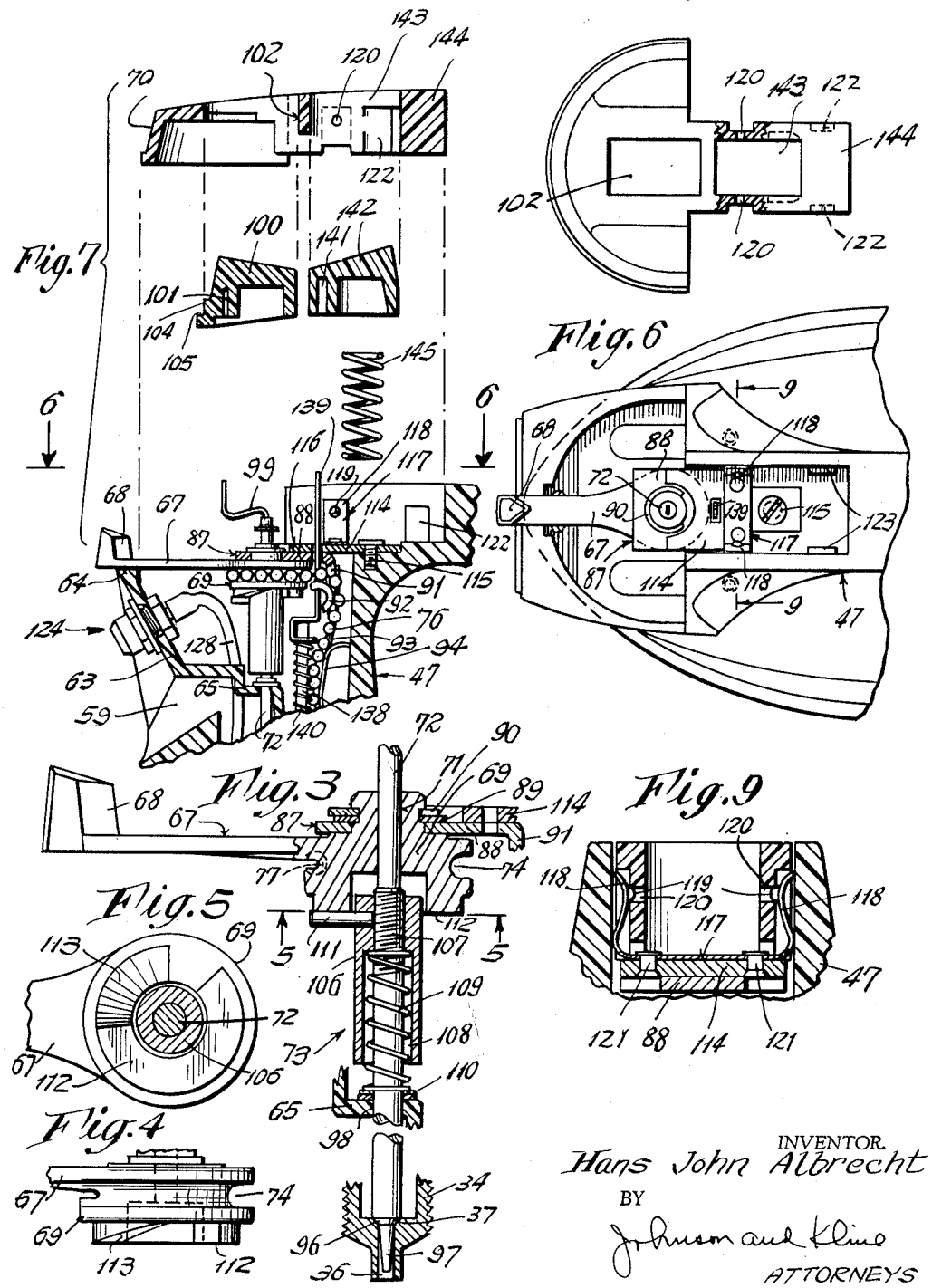

United States Patent Office 3,136,080
Patented June 9, 1964

3,136,080
CONTROL MEANS FOR STEAM IRONS
Hans John Albrecht, Trumbull, Conn., assignor, by mesne assignments, to Scovill Manufacturing Company, Waterbury, Conn., a corporation of Connecticut
Filed Jan. 8, 1963, Ser. No. 250,181
7 Claims. (Cl. 38—77)

The present invention relates to an iron for pressing fabric and more particularly to an iron construction which may be selectively employed for either dry ironing or steam ironing and into which provision may be made for spraying or sprinkling water onto the material being pressed.

Irons that are generally presently commercially available are of the type that have a metallic soleplate which is heated by electric heating means and which use a thermostat that senses the temperature of the soleplate and by controlling the energization of the heating means maintains the soleplate at a substantially constant temperature. However, as different kinds of fabric require, for most efficient ironing, a different constant temperature of the soleplate, the thermostat is normally capable of being adjusted to different temperatures that it may maintain constant. For enabling the operator to adjust the thermostat, a manually operable member is connected to the thermostat so that movement of the member also moves the adjusting element of the thermostat. When the thermostat is mounted on the middle of the inner surface of the soleplate and the manually adjustable member is positioned remote therefrom, a desirable location being at the front portion of the handle, a driving connection is required between the thermostat and the member that will accurately convey the temperature to which the member is adjusted to the thermostat in order that the thermostat will be adjusted to maintain the same temperature of the soleplate at which the member is positioned.

It is accordingly an object of the present invention to provide in an iron of the above type having a manually adjustable temperature control member at the forward end of the iron and a temperature sensing thermostat intermediate the soleplate of the iron for a simple, positive, driving interconnection therebetween which accurately relates the temperature maintained by the thermostat to that set by the member.

A further object of the present invention is to provide in an iron which may be used as a steam iron, for the temperature control member to also effect a control of the amount of steam ejected from the iron during steaming.

A further object of the present invention is to provide for an iron which may be selectively employed for either steam ironing and dry ironing and into which, with a minimum substitution and changing of parts, a spraying device may be quickly and easily incorporated so that the iron becomes a dry, steam or spraying iron.

Another object of the present invention is to provide an iron that achieves the above-noted objects and which is simple in construction, efficient in operation and relatively economical to manufacture.

A feature of the present invention resides in an iron of the above-noted type that has a manually operable temperature control member by which the user may adjust the temperature at which the soleplate is maintained and which is located remotely from the thermostat of a positive simple drive between the member and the adjustable element of the thermostat. The drive, as hereinafter disclosed, consists of an endless or closed loop chain and more specifically a ball and link chain that is made fast to and encircles a pulley connected to the control member at one loop and at its other closed loop encircles a pulley connected to the adjusting element of the thermostat. Accordingly, as the control member is mounted for pivotal movement, such movement will be translated into longitudinal movement of the ball and link chain which in turn will effect rotational movement of the thermostat adjusting element. Guides engaging the side lengths of the chain are provided to maintain the chain taut with respect to the pulleys and to also enable the chain to traverse a tortuous path between the member and the adjusting element which path keeps the chain within the confines of the exterior surfaces of the iron, without loss of accuracy in transmitting movement.

The iron of the present invention further enables steam to be ejected through the soleplate for steam ironing when desired, by the operator setting a steam control button which, unless set, causes the iron to perform a dry ironing. However, upon operation of the steam button, not only is steam ironing effected, but also the amount of steam ejected from the iron is metered or controlled in accordance with the setting of the temperature control member that operates the thermostat. Thus the one manually operable member serves to adjust both the temperature at which the soleplate is maintained and also the amount of steam which may be ejected at that temperature when steam ironing.

Other features and advantages will hereinafter appear.

In the drawing:

FIGURE 1 is an elevation of the iron of the present invention which may be utilized for either dry ironing or steam ironing, with portions broken away to show details of construction.

FIG. 2 is an elevation, substantially in section, of the iron of FIG. 1 in which spraying or sprinkling means has been incorporated therein.

FIG. 3 is a detail section of the temperature control member and the steam metering assembly, somewhat enlarged.

FIG. 4 is an elevation of a portion of the temperature control member.

FIG. 5 is a bottom view of the temperature control member taken in the direction of the arrows 5—5 of FIG. 3.

FIG. 6 is a view taken on the line 6—6 of FIG. 7 with the front cover insert and steam control and spray buttons removed.

FIG. 7 is an exploded section of the upper front portion of the iron shown in FIG. 2.

FIG. 8 is a top view of the front handle insert of the iron shown in FIG. 2, partly in section.

FIG. 9 is a section taken on the line 9—9 of FIG. 6, somewhat enlarged with the front cover insert added thereto.

FIG. 10 is a perspective view of the guide plate for guiding the chain from the pulley connected to the pivotal means for adjusting the thermostat.

Referring to the drawing, the iron of the present invention is generally indicated by the reference numeral 10 and may be an iron by which dry ironing or steam ironing may be selectively effected as by the iron indicated by the reference numeral 11 in FIG. 1 or in which as a spray assembly 12 hereinafter more specifically set forth, is added to the iron 11 to thereby render the iron capable of not only steam ironing or dry ironing, but to enable the iron to be utilized to sprinkle or spray water onto the fabric at the will of the operator. Such a dry-steam-sprinkle iron is shown in FIG. 2 and referred to by the reference numeral 13. Both the irons 11 and 13 have many parts which are identical and which are hereinafter given the same reference number.

The iron 10 includes a soleplate assembly 14 over which is disposed a cover shell assembly 15 to enclose a water reservoir 16 mounted within the cover shell and the soleplate. Secured to the cover shell is a handle assembly generally indicated by the reference numeral 17 by which the iron is grasped and in which control members are positioned for operation by the user.

Referring specifically to the soleplate assembly, shown in section in FIG. 2, there is a metal soleplate 18 formed to provide a steam generating boiler 19 of the flash boiler type and apertures 20 communicating with the boiler by which steam generated in the boiler 19 is ejected through the bottom of the soleplate to the fabric being steam ironed. Embedded within the soleplate is an electric heating coil 21 of well-known construction and secured on the upper surface of the soleplate to close the steam generating chamber and the passageways 22 communicating with the outlets 20 is a cover 23 to which is made fast a nut 24.

Rearwardly of the steam generating chamber 19 an adjustable thermostat 25 is mounted on the soleplate to be in temperature sensing relation therewith and has a rotatable shaft or element 26 for enabling adjustment of the temperature of the soleplate which the thermostat maintains constant. The thermostat has electrical connectors 27 which enable the thermostat to be connected in series circuit with the heating element 21 and to a pair of electrical conducting wires 28 and 29 which extend outwardly beyond the iron to terminate in the usual household plug, not shown, whereby electrical energy may be supplied to the iron with the thermostat controlling the electricity to the heating element.

The cover shell assembly 15 includes a sheet metal shell 30 having the shape shown which is secured to the soleplate by means of a screw 31. The water reservoir 16 is positioned beneath the cover shell and includes a bottom pan 32 having an aperture 33 through which projects a tank nut 34 that threadedly cooperates with threads 35 of the nut 24. The tank nut 34 is formed to provide a passageway 36 from the reservoir to the steam generating chamber 19 and includes a valve seat 37. A gasket 38 is preferably provided between the bottom pan 32 and the nut 24 to assure a leakproof seal. The reservoir 16 further includes an upper plate 39 having the shape shown and is formed to provide a filling aperture 40 located somewhat above the tank nut 34. In addition, for enabling passage of the screw 31 and the thermostat adjusting shaft 26 through the water reservoir without engaging water therein, ferrules 41 and 42 are connected between the bottom pan 32 and the upper plate 39. It will be appreciated that a rim 43 formed at the junction of the edges of the pan and plate and their connections to the ferrules are made to be watertight. At its rearward end, the water reservoir is secured to the soleplate by means of a support 44 welded or otherwise secured, as at 45 to the rim 43 and fastened by a screw 46 to the soleplate 18.

The handle assembly 17 includes a molded plastic one-piece member 47 formed as one piece to provide a hand grasping portion 48, a cover shell overlying portion 49 together with a front post, generally indicated by the reference numeral 50 and a rear post 51. The rear post 51 is provided with an opening 52 through which the electrical conducting wires 28 and 29 extend and which are clamped therein by a panel 53 secured to the rear post by a screw 54. The panel clamps the wires in the opening 52 and as the panel closes the rear post 51 to be part of the exterior surface of the handle assembly, preferably an inlay 55 is secured thereon with the surface of the inlay being decorative and/or carrying information. The handle member 47 is secured to the cover shell 30 by means of a screw 56 threaded into a threaded aperture 57 formed in the rear post 51 and by screws 58 threaded into the forward portion.

In accordance with the present invention either of the irons 11 and 13 may be selectively utilized for steam ironing and to this end, the front post 50 is formed to provide a filling aperture 59 which includes a downwardly extending portion 60 that projects through the aperture 40 formed in the upper plate 39 of the water reservoir and a coextensive aperture 61 formed in the cover shell 30 with preferably a gasket 62 being positioned between the cover shell and the upper plate. The aperture 59 permits filling and emptying of the water reservoir by being in direct communication therewith. The front post 50 further includes a support that includes an upwardly and forwardly inclined portion 63 terminating in a horizontal surface 64 at the top thereof and a series of stepped horizontal portions 65 and 66 extending from the lower end thereof.

In carrying out the present invention, a manually operable temperature control member 67 is located at the forward end of the handle assembly and is mounted for horizontal pivotal movement. To convey the position of the temperature control member 67 to a position of the adjusting shaft 26 of the adjustable thermostat 25, the present invention utilizes a simple and yet positive drive as is hereinafter set forth. To this end, the temperature control member 67 is preferably molded of plastic material to have the manipulatable lever 68 and a hub portion 69 located remote therefrom. The lever 68 projects outwardly from the front post to facilitate operation thereof by a user and serves as an indicator on a temperature graduated dial that may be marked on an exterior surface 70. The hub portion 69 has a central aperture 71 through which passes a meter or valve rod 72 of a steaming control assembly 73 hereinafter more specifically set forth so that the hub portion and lever can horizontally pivotally move the valve rod 72.

For translating position and pivotal movement of the lever by which the operator sets the temperature which the thermostat 25 maintains the soleplate, the hub portion 69 is formed with an annular groove 74 constituting a pulley into which is positioned one loop 75 of an endless or continuous ball and link chain 76. The chain 76 is held against movement with respect to the pulley by providing at least one narrow projection on the groove which extends between two adjacent balls and with such a projection being indicated by reference numeral 77.

The other loop 78 of the endless chain circumscribes another pulley 79 that is made fast on a shaft 80 that is formed at its lower end with an axial hole 81 having serrations 82 which cooperate with axial serrations formed on the end 83 of the thermostat adjusting shaft 26 so that rotative movement of the pulley 79 is transmitted to the shaft 80 and then to the shaft 26. The upper end of the shaft 80 is rotatably mounted in a bearing aperture 84 formed within the overlying portion 49 of the handle member which is preferably closed by a disk 85. Preferably, a washer 86 is mounted between the cover shell and the overlying portion.

In accordance with the present invention the ball and link chain 76 is of the justified type in that the balls have been stretched a predetermined distance apart to have a set pitch and thus there is accurate translation of movement between the two pulleys. For guiding the chain in a path between the two pulleys 74 and 79 and yet keeping the chain within the handle, there is provided a stationary L-shaped plate 87 (see FIG. 10) that has a horizontal leg 88 that, as will be hereinafter apparent, supports the hub portion 69 by a washer 89 and retaining ring 90. A depending leg 91 of the plate 87 has an arcuately shaped wing 92 extending outwardly on both sides over which each side or stretch of the endless chain is guided. Moreover, secured to the depending leg 91 is a tensioning and guiding member 93 that extends downwardly and has spaced arms 94 projecting from each side with each arm 94 being arcuately curved as shown. The ends of each arm engage a substantially vertical surface formed in the handle member 47 and by the arms being resilient, it tensions the chain to maintain it taut on the pulleys in addition to providing a kinkless and snag-free guide for the chain. It will thus be appreciated that movement of the manual control member 67 is translated into pivotal movement of the pulley 74 which in turn effects movement of the endless chain 76, rotation of the pulley 79 and consequent movement of the temperature adjusting shaft 26. The movement of the lever 68 for a selected number of degrees of temperature change is easily correlated to the movement that the adjusting shaft requires to change the thermostat the same number of degrees by the relative diameters of the pulleys.

The steam assembly 73 which is selectively actuated by the operator to provide steam ironing includes the aforementioned valve rod 72 that is formed at its lower end with a frusto-conical stopper portion 96 that mates with the valve seat 37 formed in the tank nut 34 to thereby form a valve in the passageway 36 between the water reservoir 16 and the steam generating chamber 19. A further extending portion 97 of decreasing diameter constitutes a metering valve since as the valve rod is increasingly lifted upwardly, the opening in the passageway through which water may pass is increased in size. The valve rod 72 extends upward through an aperture 98 formed in the horizontal portion 65 and through the hub portion 69 to have secured at its upper end a somewhat Z-shaped link 99. The link 99 is operatively connected to a steam control button 100 as by a slot 101 formed in the button receiving the end of the link. The control button 100 is mounted for substantially reciprocating movement in an aperture 102 formed in a front cover insert 103 and includes an upper ledge 104 and a lower ledge 105 each abuttable with the edge of the insert for different positions of the button.

As shown in FIGS. 1 and 2, when the lower ledge 105 engages the insert 103 the valve rod 72 is opened while if the steam control button 100 is depressed so that the upper ledge 104 engages the front cover insert, the valve rod is forced to its closed position. It will be appreciated however that while the closed position of the rod 72 is effected by the steam control button 100, that the steam button cannot pull the valve rod 72 to its open position when the button is moved to its open position. The link 99 is preferably somewhat flexible to enable the limited pivotal movement required of the button 100 between its two positions and to maintain the position at which the button is placed.

While the operator, by the button may selectively effect either dry or steam ironing, in accordance with the present invention, the amount of water flowing from the water reservoir to the steam generating chamber is metered to thereby control the amount of steam created and passed to the fabric being ironed. This is accomplished automatically and in accordance with the temperature which the user selects by the position of the temperature lever 68. Accordingly, the valve rod 72 has bushing 106 secured thereon as by threads 107 and is formed to provide an axial aperture 108 in which is positioned a spring 109 that is having one end bearing against washers 110 on the horizontal portion 65 and its other end abutting the end of the axial aperture 108. The spring 109 is under compression and normally urges the valve rod 72 to its open position. A cam follower 111 shown as a pin that extends radially outwardly from the bushing 106 is positioned to abut and ride against the lower surface 112 of the hub portion 69. This lower surface is formed as a cam surface and has a gradual rise portion indicated by the reference numeral 113. Thus as the lever 68 is moved clockwise to increase the temperature, the gradual rise 113 of the cam is followed by the cam follower 111 which enables the spring 109 to move the valve rod 72 upwardly as the cam and cam follower permit, thereby achieving a metering of the flow of water and hence steam, in accordance with the soleplate temperature selected by the user and maintained by the adjustable thermostat 25.

In order to prevent the spring 109 from moving the temperature control member 67 upwardly on the valve rod 72, a horizontally extending support plate 114 is secured, as by a screw 115, to the handle member 47 and has a lower surface 116 that abuts the horizontal leg 88 of the L-shaped chain guide 87 thereby maintaining the member 67 at its selected height. Moreover, the support plate 114 serves to releasably secure the front cover insert 103 in position by means of a U-shaped clip 117 secured on the upper surface of the support plate with each leg 118 of the spring member being formed with a projection 119 that engages an aperture 120 formed in either side of the front cover insert 103. Thus detail of construction is specifically shown in FIG. 9 wherein the securement means between the support plate and the U-shaped clip 117 consists of rivets 121. Additionally, the front cover insert 103 is preferably formed with grooves 122 at its rearward end which mate with tongues 123 formed in the handle member to thereby securely hold the insert to the handle member 47 and yet permit removal of the insert.

In order to convert the steam-dry iron shown in FIG. 1 to the steam-dry-spray iron disclosed in FIG. 2, there is added to the iron 11, the spray assembly 12. This includes a nozzle 124 clamped at an aperture 125 formed in the inclined portion 63 and having an inlet 126 normally closed by a spring pressed ball 127. Connected to the nozzle opening is a tube 128, preferably flexible, that also connects to an outlet 129 of a water pump 130 having a cylinder 131 and a piston 132 together. An inlet 133 to the cylinder is normally open but may be closed by a closing ball 134. The cylinder 131 has a small diameter portion 135 extending through an aperture 136 formed in the horizontal portion 66 and is secured thereto as by a retaining ring 137 thereby making the cylinder fast to the handle member. The piston 132 has an actuating portion 138 that vertically extends through and beyond the small diameter portion 135 and to which is operatively connected an actuating link 139 formed in to the shape shown from a flat strip. Circumscribing the piston is a spring 140 which abuts the end of the actuating link 139 and the retaining ring 137 to normally urge the piston to the position shown wherein the cylinder 131 is filled with water. The actuating link 139 terminates in a slot 141 formed in a spray button 142 that is mounted for reciprocating vertical movement in a rectangular aperture 143 formed in a front cover insert 144 that is similar to the insert 103 but has the aperture 143 formed therein. A spring 145 having a lower end bearing against the support plate 114 and its upper end being positioned within an indentation 146 formed in the under surface of the spray button and bearing against the bottom thereof urges the spray button 142 upwardly to the position shown. Side flanges, not shown, are preferably formed on the spray button to prevent the button from escaping upwardly through the aperture by the flanges engaging the insert.

Accordingly, if the user desires to spray or sprinkle, the spray button is depressed against the action of springs 140 and 145 which through the actuating link 139 causes the piston 132 to move downwardly in the cylinder 131. The water pressure in the cylinder thus produced causes the check valve 134 to close the inlet 133 and forces the water in the cylinder through the tube 128 and out the nozzle 124 in a fine spray. Upon release of the button 142, the springs 140 and 145 effect upward movement of the button and the piston, and the suction thus created causes the closing of the inlet 126 and the opening of the inlet 133 by the pressure of the water in the reservoir raising the check valve 134 thereby enabling water to be sucked into the cylinder from the reservoir. Continued manual manipulation of the spray button will thus provide for further spraying or sprinkling.

It will be appreciated that the addition of the spray assembly 12 to the steam-dry iron 11 shown in FIG. 1 requires only the substitution of a different front cover insert, namely insert 144 for insert 103 and the making of the aperture 136. Moreover, the aperture 125 formed in the inclined portion 63, where the nozzle is positioned, has a plug 147 substituted therefor when the spray assembly is not incorporated into the iron.

In order to enable a user to substantially completely empty the iron by the spray button, there is provided an inlet tube 148 that has one end connected to the inlet 133 of the water pump 130 and its other end terminating at the front of the water reservoir 16, remote from the passageway 36. Thus water sprayed by the spray assembly 12 is obtained from the front of the reservoir.

It will accordingly be appreciated that there has been disclosed an iron by which the user may either dry iron or by operation of a control button effect steam ironing. With either ironing a temperature control dial is conveniently positioned at the front of the iron and yet through a simplified and yet positive drive, movement of the manual temperature control is translated to movement of the adjustable thermostat control member to thereby adjust the thermostat to maintain the soleplate at the temperature which the user selects by the position of the temperature control member. Moreover, in accordance with the present invention the temperature control member when steaming automatically controls the amount of stem formed by metering the flow of water that is flashed into steam by the position of the temperature indicator thereby obviating spitting of water when steaming and preventing maintaining undue cooling of the soleplate. Moreover, while these features are incorporated in a steam and dry iron, such an iron may be easily converted from a dry-steam iron to a dry-steam-sprinkle iron by the addition of a spray assembly which requires only slight modification of the dry-steam iron.

Variations and modifications may be made within the scope of the claims and portions of the improvements may be used without others.

I claim:

1. An iron comprising a soleplate, a handle mounted on the soleplate, electric heating means for heating the soleplate, an adjustable thermostat mounted in temperature sensing relation with the soleplate and electrically connected to the heating means and having an adjusting member by which the temperature at which the soleplate is maintained by the thermostat may be adjusted, a manually operable means mounted in the handle and including a pivotal member remote from the adjusting member, and means interconnecting the pivotal member to the adjusting member for causing the adjusting member to be moved with movement of the pivotal member, said means including a pair of pulleys, one pulley being connected to the pivotal member, the other pulley being connected to the adjusting member and a closed loop chain in continuous driving connection with the two pulleys, said chain having two stretches leading from diametrically opposite sides of each of the pulleys whereby the pulley connected to the adjusting member is rotated by operation of the pulley connected to the manually operable means in both clockwise and counterclockwise directions.

2. An iron as defined in claim 1 in which there are guide means including means adjacent the pulley for the pivotal member and extending outwardly therefrom for guiding each stretch of the chain in a curved path between said two pulleys.

3. An iron comprising a soleplate, a handle mounted on the soleplate, electric heating means for heating the soleplate, an adjustable thermostat mounted in temperature sensing relation with the soleplate and electrically connected to the heating means and having an adjusting member by which the temperature at which the soleplate is maintained by the thermostat may be adjusted, a manually operable means mounted in the handle and including a pivotal member remote from the adjusting member, means interconnecting the pivotal member to the adjusting member for causing the adjusting member to be moved with movement of the pivotal member, said means including a pulley connected to the pivotal member, a pulley connected to the adjusting member and a closed loop chain in driving connection with the two pulleys, and tensioning means comprising a resilient member bearing against a portion of each stretch of the chain for resiliently urging the chain into a curving path to thereby maintain tension on the chain.

4. The invention as defined in claim 1 in which the closed loop chain is a ball and link chain having a determinate length, and means on the pulley for the pivotal member for connecting the chain thereto for coordinate movement therewith.

5. An iron comprising a soleplate formed to provide a steam generating chamber, a handle mounted on the soleplate, electric heating means for heating the soleplate, an adjustable thermostat mounted in temperature sensing relation with the soleplate and electrically connected to the heating means and having an adjusting member by which the temperature at which the soleplate is maintained may be adjusted, a manually operable means mounted in the handle and including a pivotal member remote from the adjusting member, means interconnecting the pivotal member to the adjusting member for causing the adjusting member to be moved with movement of the pivotal member, said means including a pulley connected to the pivotal member, a pulley connected to the adjusting member and a closed loop chain in driving connection with the two pulleys, a water reservoir positioned above the soleplate and including a passageway to the steam generating chamber, a valve rod positioned in the passageway for movement to control the flow of water therethrough, said valve rod extending upwardly into the front portion of the handle and forming the pivot for the pivotal member, means urging the valve rod to a fully open position, and means carried by the pivotal member for controlling the amount of movement of the rod to its fully open position by the position of the pivotal member to thereby meter the flow of water through the passageway in accordance with the temperature to which the thermostat is adjusted.

6. The invention as defined in claim 5 in which there is a manually operable knob connected to the valve rod and having a first position which maintains the rod in its valve closing position irrespective of the position of the pivotal member and a second position that permits the rod to move to its fully open position.

7. The invention as defined in claim 5 in which the last-named means includes a cam surface on the pivotal member and a cam follower operatively associated with the valve rod.

References Cited in the file of this patent

UNITED STATES PATENTS

| | | |
|---|---|---|
| 2,411,199 | Felver | Nov. 19, 1946 |
| 2,713,221 | Smellie | July 19, 1955 |
| 3,038,269 | Knapp | June 12, 1962 |
| 3,041,757 | Swenson et al. | July 3, 1962 |